UNITED STATES PATENT OFFICE.

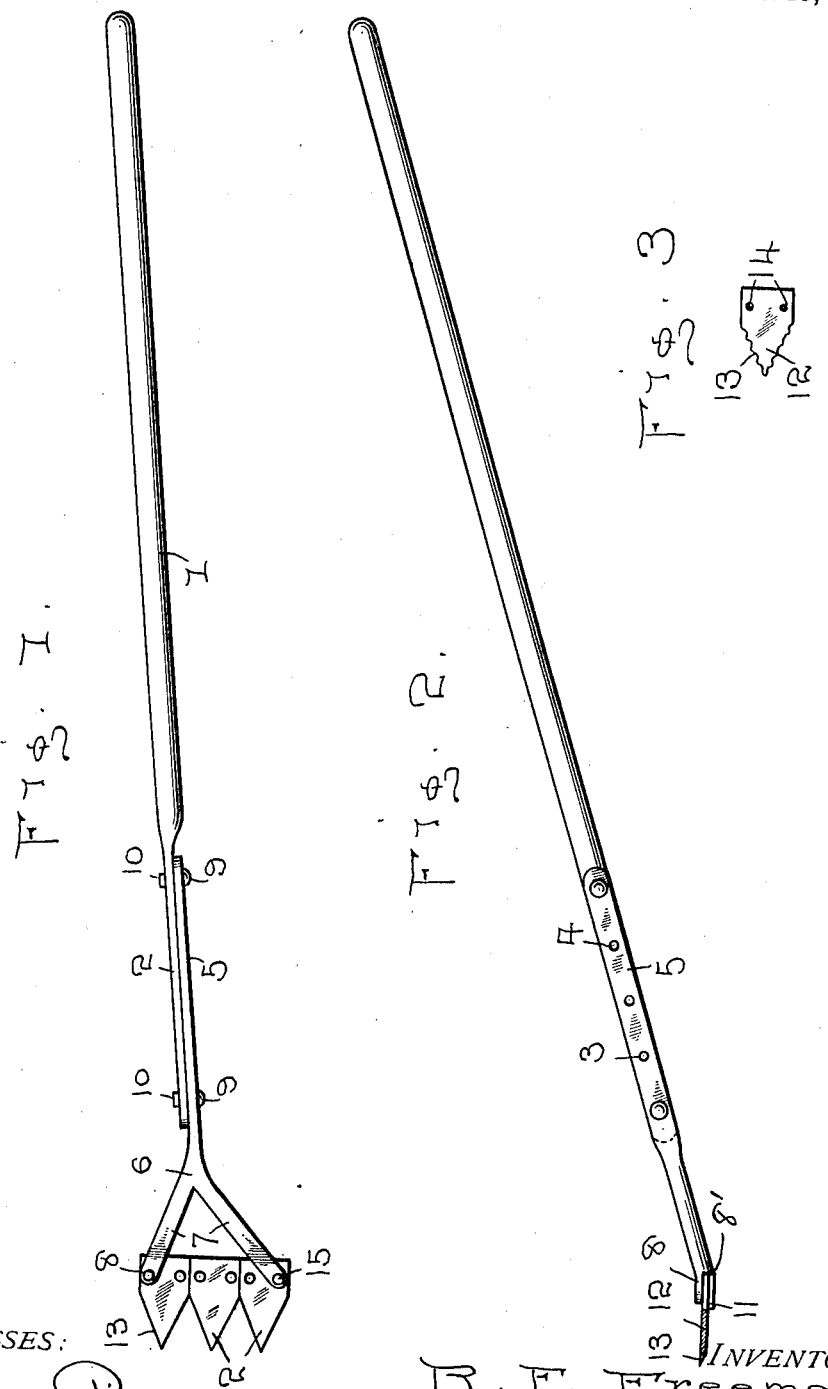

ROBERT E. FREEMAN, OF MAPLE CITY, MICHIGAN.

BEAN-PULLER.

1,020,408.  Specification of Letters Patent.  Patented Mar. 19, 1912.

Application filed March 18, 1911. Serial No. 615,286.

*To all whom it may concern:*

Be it known that I, ROBERT E. FREEMAN, a citizen of the United States, residing at Maple City, in the county of Leelanau and State of Michigan, have invented certain new and useful Improvements in Bean-Pullers; and I do hereby declare the following to be a full, clear, and exact description of the invention, such as will enable others skilled in the art to which it appertains to make and use the same.

This invention relates to farming implements and more particularly to bean pullers.

An object of the invention is to provide a bean puller adapted to be operated by hand, and one which will be simple in construction, light in weight, easy to manipulate and effective in use.

Another object is to provide a device of this character provided with separate removable blades or cutting teeth beveled or sharpened upon their under sides, means for adjusting the length of the handle, and detachable connections between the handle and the blades or teeth.

A further object is to provide a bean puller consisting of a hollow handle having adjusting means near its lower end and having secured upon its lower extremity a series of detachable pulling or cutting blades or teeth directed at an angle to said handle.

Other objects and advantages will be hereinafter set forth and pointed out in the specification.

In the accompanying drawings which are made a part of this application, Figure 1 is a top plan view of the implement. Fig. 2 is a side elevation thereof, and, Fig. 3 is a detail view of a modified form of blade.

Referring to the drawings, 1 represents a hollow handle having its lower portion 2 flattened and provided with spaced apertures 3 adapted to register with the correspondingly spaced apertures 4 of the flattened upper end 5 of the connecting member 6, which has its lower extremity split forming the arms 7 having their extremities perforated as shown at 8.

By means of the spaced apertures 3 and 4 the length of the handle may be adjusted and secured in adjusted position by means of the securing bolts 9 being passed through said registering apertures and secured by the nuts 10. The handle 1 is formed of hollow tubing for the purpose of making the same light and easy to manipulate. If desired, however, the handle may be made of wood and have a hand hold upon its upper end. The flattened portions 2 and 5 may be either on the sides or top and bottom of the overlapping ends.

A perforated bar 11 has riveted thereto the pulling or cutting knives or blades 12. These blades are preferably formed with V-shaped pointed ends, as illustrated, the angled portions 13 being sharpened or beveled upon the under sides thereof to form sharp cutting edges. If desired, however, the cutting portions of said blades 12 may be serrated, as shown in Fig. 3. The blades are provided with two or more apertures 14 near the rear edges thereof, through which pass rivets or other securing means which have their opposite ends secured in the apertures of the plate 11.

Passing through the outer perforations 14 of the outer blades 12 and through the apertures near the opposite ends of the plate 11, are the bolts 15 which have their upper ends secured in the perforated extremities 8 of the arms 7 to detachably connect the cutting mechanism with the handle of the implement. The plate 11 rests against the shoulders 8'.

As will be noted the perforated extremities 8 are directed at a slight angle to the handle 1 and thus hold the cutting blades 12 carried by plate 11 at the same slight degree of angle to the handle. The blades 12 may be on top of (as shown) or underneath the plate 11. Owing to the fact that the blades 12 are beveled on the under faces thereof and are held at the slight angle to the handle 1 (as illustrated) the implement is of high efficiency in pulling or cutting the beans from the vines. As will be understood the beans cut from the vines will fall upon the blades 12, the cut stems resting between or near the meeting faces of the blades 12. As there is only a slight danger of the cut beans falling to the ground, the operator may readily lift them upon the blades to the receptacle within which they are to be placed, eliminating all necessity of the gatherer stooping to the ground or changing his position to gather the beans from upon the ground. Thus, it will be seen that the operator may retain his erect position while using the above described implement, and by so doing he will be able to work more steadily and accomplish much more than has heretofore been possible.

It will be readily apparent that the above described implement may be formed of very light material and will be very effective in its operation. It is also possible to remove any one of the blades 12 to sharpen the same or replace it with a new one whenever necessary without disturbing the other blades in any manner.

Owing to the fact that by means of the peculiar construction of the implement the blades 12 extend farther to one side of the plane of the handle than to the other side, the force exerted by the manipulator and the strain upon the parts of the device are properly equalized and distributed.

What I claim is:

A bean puller comprising a hollow adjustable handle having its lower portion flattened and provided with longitudinally spaced apertures, a connecting member flattened at one end and provided with spaced apertures adapted to register with the apertures in the handle, the opposite end of said connecting member being split to form two arms, said arms being cut away near their outer ends to form recesses, said arms being apertured at their extremities, a bar having blades secured thereto and adapted to be secured at the opposite ends within said recesses and means adapted to pass through the registering apertures in said handle and connecting member for locking the same.

In testimony whereof I have signed my name to this specification in the presence of two subscribing witnesses.

ROBERT E. FREEMAN.

Witnesses:
PERRY BOYNTON,
M. A. CLEES.

---

Copies of this patent may be obtained for five cents each, by addressing the "Commissioner of Patents, Washington, D. C."